United States Patent [19]
Stone

[11] Patent Number: 5,948,269
[45] Date of Patent: Sep. 7, 1999

[54] PROCESS FOR THE REMOVAL AND SUPPRESSION OF DISSOLVED HYDROGEN SULFIDE AND OTHER MALODOROUS COMPOUNDS AND REDUCTION OF ACIDITY IN LIQUID AND SLUDGE WASTEWATER SYSTEMS

[76] Inventor: Michael D. Stone, 929 Pine Tree La., DeSoto, Tex. 75115

[21] Appl. No.: 08/915,441

[22] Filed: Aug. 20, 1997

[51] Int. Cl.$^6$ .................................. C02F 1/20; C02F 1/52
[52] U.S. Cl. ........................ 210/718; 210/722; 210/724; 210/726; 210/750; 210/916
[58] Field of Search .................... 210/916, 702, 210/749, 718, 722, 723, 724, 726, 750

[56] References Cited

U.S. PATENT DOCUMENTS

| | | | |
|---|---|---|---|
| 1,757,526 | 5/1930 | Hedgepeth | 210/726 |
| 1,956,420 | 4/1934 | Gleason et al. | 210/724 |
| 2,116,053 | 5/1938 | Urbain et al. | 210/722 |
| 2,129,267 | 9/1938 | Fischer | 210/726 |
| 2,171,203 | 8/1939 | Urbain | 210/2 |
| 3,173,863 | 3/1965 | Oster | 210/723 |
| 3,300,404 | 1/1967 | Howe | 210/11 |
| 3,522,173 | 7/1970 | Lindman | 210/49 |
| 3,948,774 | 4/1976 | Lindman | 210/192 |
| 3,966,450 | 6/1976 | O'Neill | 71/15 |
| 4,008,775 | 2/1977 | Fox | 175/64 |
| 4,108,771 | 8/1978 | Weiss | 210/723 |
| 4,123,355 | 10/1978 | Poradek | 210/50 |
| 4,344,842 | 8/1982 | Fox | 208/244 |
| 4,366,131 | 12/1982 | Fox | 423/231 |
| 4,446,031 | 5/1984 | List | 252/1 |
| 4,476,027 | 10/1984 | Fox | 210/695 |
| 4,501,668 | 2/1985 | Merk | 210/749 |
| 4,541,986 | 9/1985 | Schwab | 422/5 |
| 4,612,124 | 9/1986 | Escrig | 210/721 |
| 4,680,127 | 7/1987 | Edmonson | 210/749 |
| 4,681,687 | 7/1987 | Mouché | 210/764 |
| 4,705,638 | 11/1987 | Ganczarczyk | 210/710 |
| 4,902,408 | 2/1990 | Reichert | 208/239 |
| 4,911,843 | 3/1990 | Hunniford | 210/610 |
| 4,956,160 | 9/1990 | Reichert | 423/231 |
| 5,141,647 | 8/1992 | Bhadra | 210/620 |
| 5,200,092 | 4/1993 | Richards | 210/758 |
| 5,228,995 | 7/1993 | Stover | 210/603 |
| 5,286,389 | 2/1994 | Hardison | 210/712 |
| 5,292,440 | 3/1994 | Hardison | 210/712 |
| 5,336,431 | 8/1994 | Richards | 252/184 |
| 5,350,516 | 9/1994 | Bhadra | 210/602 |
| 5,614,102 | 3/1997 | Sakurada | 210/718 |

FOREIGN PATENT DOCUMENTS

| | | |
|---|---|---|
| 3200164 | 12/1982 | Germany . |
| 54-128976 | 10/1979 | Japan . |
| 58-112096 | 7/1983 | Japan . |
| 2808 | 10/1865 | United Kingdom . |
| 421643 | 12/1934 | United Kingdom . |

OTHER PUBLICATIONS

Environmental Protection Agency 1985 Odor and Corrosion Control in Sanitary Sewerage Systems & Treatment Plants (Section 3.3, pp.53–61).

*Primary Examiner*—Christopher Upton
*Attorney, Agent, or Firm*—Carla J. Dolce

[57] ABSTRACT

Nuisance concentrations of hydrogen sulfide and other malodorous compounds are controlled in liquid and sludge waste systems by adding alkaline iron. The process removes immediate sulfide and suppresses the formation of further nuisance sulfide with a single application. As the sulfide and other malodors are being mitigated in this process, alkalinity is added to the waste as a reaction by-product, which acts to increase the waste pH, decreasing corrosivity and promoting biological treatability and purification of the waste.

22 Claims, 1 Drawing Sheet

Typical Wastewater Collection System and Treatment Plant

Figure 1: Typical Wastewater Collection System and Treatment Plant
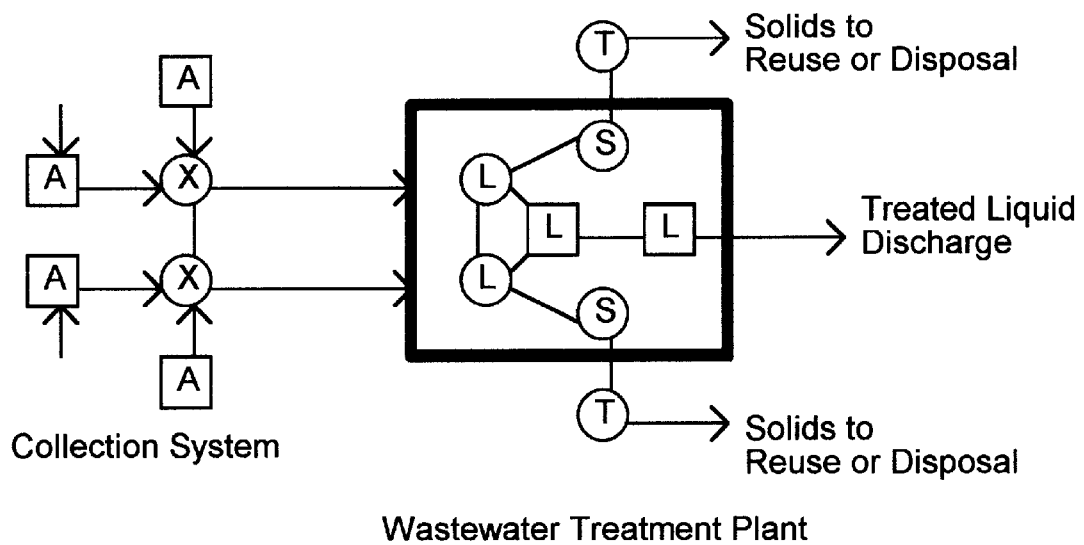

PROCESS FOR THE REMOVAL AND SUPPRESSION OF DISSOLVED HYDROGEN SULFIDE AND OTHER MALODOROUS COMPOUNDS AND REDUCTION OF ACIDITY IN LIQUID AND SLUDGE WASTEWATER SYSTEMS

BACKGROUND—FIELD OF INVENTION

This invention relates to a process for the removal and suppression of dissolved hydrogen sulfide and other malodorous compounds and reduction of acidity in liquid and sludge wastewater systems using alkaline iron compounds.

BACKGROUND—DESCRIPTION OF PRIOR ART

Natural sewage and wastewater putrefaction in the absence or near absence of oxygen produces malodorous byproducts, including hydrogen sulfide, $H_2S$, sulfur containing organic compounds, nitrogen containing organic compounds, and volatile organic acids. Some of these byproducts are characteristically acidic and thus tend to destroy the natural alkalinity in the wastewater or sludge, making the waste stream acidic. This acidity can be corrosive to equipment that contains and conveys the waste. Therefore, anaerobic or oxygen limited waste streams are malodorous and corrosive as a result of natural decay.

Because of the dominance and pervasiveness of hydrogen sulfide in malodorous wastewater systems, this compound can be taken as representative of odor forming compounds in these systems.

Besides being a serious malodor problem, uncontrolled hydrogen sulfide formation in closed or contained structures can concentrate to toxic levels. Workers in and around sewage collection systems and wastewater treatment plants can be at health risk if the toxic levels are not mitigated.

Hydrogen sulfide is a corrosive gas and attacks metal and concrete components of wastewater systems such as conveyance pipes, structures, pumps, treatment equipment, and electrical appurtenances. Hydrogen sulfide gas can react with available moisture and air to form sulfuric acid, which compounds the corrosive potential of uncontrolled hydrogen sulfide formation.

The control of hydrogen sulfide includes eliminating it's presence and suppressing it's formation in dissolved and gaseous forms. By eliminating and suppressing this noxious, corrosive compound, appurtenances and facilities that are used to convey, store, treat, process, dispose, and otherwise manage wastewater, sewage, and waste sludges will be mitigated of nuisance odor, safer, and less apt to destructive corrosion. Additionally, areas and neighborhoods surrounding waste appurtenances and facilities will be improved.

Malodorous byproducts of wastewater systems have been battled for many years. However, none of the methods used suppress completely malodorous formation without multiple doses of chemical treatment. This is an even greater problem in wastewater sludge systems where pollutant strength and malodor generation potential can be hundreds of times greater than liquid wastewater streams.

Among the treatments employed for hydrogen sulfide and malodor have been chemical oxidation, biological oxidation, coagulation, filtration, adsorption, dissolution, masking, and chemical conversion to a nonodorous compound. A comprehensive treatise is given in the Environmental Protection Agency Design Manual *Odor and Corrosion Control in Sanitary Sewerage Systems and Treatment Plants* (October 1985).

The control of hydrogen sulfide and objectionable odors in sewage using nitrates and nitrites is taught in U.S. Pat. Nos. 3,300,404; 3,966,450; 4,681,687; and 4,911,843. Nitrates in combination with alkali metal permanganates are used to control odors in U.S. Pat. Nos. 5,200,092 and 5,336,431. In U.S. Pat. No. 4,123,355, the patentee used sulfur dioxide to control odors, hydrogen sulfide and septicity in sewage.

Other prior art teaches the control of hydrogen sulfide and odors: In U.S. Pat. No. 4,680,127, using glyoxal with formaldehyde or glutaraldehyde; in U.S. Pat. No. 4,902,408, using transition metal carboxylates; in U.S. Pat. No. 4,501,668, using a condensation product of acrolein and formaldehyde with a basic catalyst; in U.S. Pat. No. 4,612,124, using hydrogen peroxide; and in U.S. Pat. No. 4,541,986, using chlorite compounds.

The use of iron salts, individually or in conjunction with other chemicals, in water and wastewater treatment has been practiced for many years. These compounds are used for particulate coagulation and solids removal; phosphorus removal; wastewater solids conditioning prior to dewatering; and sulfide malodor mitigation.

In U.S. Pat. No. 4,446,031, the patentee used nitrates with iron salts to minimize the formation of noxious sulfides. In U.S. Pat. No. 4,108,771, various oxidizing agents in combination with iron salts are used for malodor control in organic wastes. Sulfur dioxide is used with iron salts to control malodor and septicity in sewage in U.S. Pat. Nos. 3,522,173; 3,948,774; 5,141,647; and 5,350,516.

Hydrogen sulfide removal using various iron oxides is taught in U.S. Pat. Nos. 4,008,775; 4,344,842; 4,366,131; 4,476,027; 4,705,638; and 4,956,160. Polyvalent chelated iron is used for sulfide control in U.S. Pat. Nos. 5,286,389 and 5,292,440. The purification of polluted water by generating iron sulfate using sulfur dioxide and scrap iron is given by U.S. Pat. No. 2,171,203.

Iron salts typically used for the mitigation of sulfide malodors include ferrous and ferric chloride and sulfate. Use of these conventional iron salts, however, can create undesirable or even detrimental side-effects in the waste being treated.

Conventional iron salts are immediately solubilized in liquid waste systems providing excellent reactivity with the targeted sulfide for immediate mitigation, however, any excess solubilized iron salt will react with phosphorus and other compounds in the waste. This competing reactivity effect reduces the availability of conventional iron salt for long-term sulfide malodor control without multiple doses.

Conventional iron salts can also present a problem with control of waste stream acidity. The chemical reaction by-product of hydrogen sulfide with conventional iron salt is a mineral acid, usually hydrochloric or sulfuric. This acid destroys natural system alkalinity which is necessary for natural biological treatability and waste purification; this acid can also increase the corrosivity of the waste; and this acid can reduce the waste pH, increasing the formation of subsequent malodorous sulfide. Additionally, conventional iron salts are manufactured, sold commercially and used in aqueous form. However, free mineral acids of various concentrations are typically present in these liquid products to keep the iron soluble. These free acids will also act to depress waste system alkalinity and pH which compound the negative acidity effects previously discussed.

The present invention is an improvement over known processes using iron compounds to mitigate hydrogen sulfide and other malodorous compounds in waste systems. The alkaline iron compounds used in this invention are sparingly soluble in water, but when added to a liquid or sludge waste with hydrogen sulfide or other acids present, it is theorized that the alkaline iron solubilizes and chemically reacts to mitigate sulfide malodors and waste acidity. In so doing, the alkaline iron becomes an on-demand malodor mitigation agent.

As a result of adding alkaline iron, immediate sulfide malodors are removed; alkalinity is released from the alkaline iron compound to mitigate waste acidity and corrosivity; subsequent sulfide malodor formation is suppressed due to the increased waste alkalinity and pH and the availability of unreacted alkaline iron that has not been lost to competing reactions; and the biological treatability and purification of the waste are enhanced.

Objects and Advantages

Accordingly, several objects and advantages of the invention are:

1. The removal of immediate dissolved hydrogen sulfide and other malodorous compounds in liquid and sludge wastewater systems without the adverse effects of acid by-products from using conventional iron salts.

2. The suppression of dissolved hydrogen sulfide and other malodorous compound formation in liquid and sludge wastewater systems with a single application through (1) solubility characteristics uniquely exhibited by the alkaline iron, which are activated by hydrogen sulfide and other acid compounds in the waste, and (2) alkalinity and pH increases in the waste caused by reaction of alkaline iron with malodorous sulfides.

3. The reduction of waste acidity and corrosivity through release of alkalinity during the sulfide malodor mitigation reaction, causing the waste pH to increase.

Other objects and advantages of the invention include:

1. Through the mitigation of sulfide malodors and the release of alkalinity, this process enhances conditions in the waste that promote biological treatability and purification of the waste.

2. Through the removal of dissolved sulfides, this process mitigates gaseous sulfide malodors, corrosivity, and toxicity in areas and structures subject to contact with the waste gases.

Further objects and advantages of the invention will become apparent from a consideration of the drawing and ensuing description.

DESCRIPTION OF DRAWING

FIG. 1 is a diagram representing a typical wastewater collection system and treatment plant to illustrate possible application points for the invention and is employed in the Operation described herein. The arrows represent the general direction of waste flow; that is, wastewater collection system flow is directed through pipe access points and toward the treatment plant and wastewater treatment plant flow is directed through treatment units and toward an effluent discharge for the liquid portion of the treated waste and disposal or reuse for the solids portion of the treated waste. This FIGURE is for illustration and example purposes only.

List of Referenced Identifiers in Drawing

A Application point in the wastewater collection system for dosing the alkaline iron product X A malodor problem point in the wastewater collection system L A malodorous liquid treatment unit within the wastewater treatment plant S A malodorous sludge treatment unit within the wastewater treatment plant T A malodorous sludge transmission or storage vessel prior to disposal or reuse of the sludge solids

DESCRIPTION OF THE INVENTION

The removal and suppression of dissolved hydrogen sulfide and other malodorous compounds and reduction of corrosion causing acidity in waste streams occurs by introducing alkaline iron. Alkaline iron is represented by a class of compounds containing alkaline anions of iron; the most common examples being iron (II and III) hydroxide, bicarbonate, carbonate, hydroxide oxide, and hydrated oxide. Alkaline iron can be added to and/or can be formed in the wastewater or wastewater sludge stream or containment vessel. Alkaline iron compounds are sparingly soluble in clean water, and are believed to be solubilized by the dilute acids formed during waste decay. It is theorized that the alkaline iron reacts with the dilute acids according to the general half-reaction:

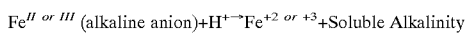

$$Fe^{II \ or \ III} \text{(alkaline anion)} + H^+ \rightarrow Fe^{+2 \ or \ +3} + \text{Soluble Alkalinity}$$

The Soluble Alkalinity formed in the above reaction is then available to react with and reduce further acidity and solution corrosivity, thus suppressing the generation of subsequent hydrogen sulfide and other malodorous compounds. It is further theorized that the iron II or III cation ($Fe^{+2 \ or +3}$) reacts with $H_2S$ or other malodorous sulfur compound according to the half-reaction:

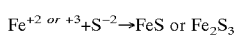

$$Fe^{+2 \ or \ +3} + S^{-2} \rightarrow FeS \text{ or } Fe_2S_3$$

Thus through addition of the alkaline iron product:

immediate malodor causing sulfur compounds are removed because of the iron available for reaction, and solution acidity and corrosivity are reduced because of the alkalinity available as a reaction byproduct, and subsequent formation of malodorous sulfur compounds and solution acidity are suppressed due to the sparingly soluble nature of the alkaline iron product and the alkalinity available as a reaction byproduct.

These characteristics make alkaline iron available to mitigate waste generated malodors and corrosivity as waste conditions demand.

OPERATION OF THE INVENTION

Alkaline iron, consisting of a single compound or a mixture of compounds including ferrous and ferric hydroxide, carbonate, bicarbonate, hydroxide oxide, or hydrated oxide, is sparingly water soluble. One embodiment (Number 1) of the process involves the preparation of the alkaline iron outside the waste stream followed by addition to the waste stream or storage vessel. A second embodiment (Number 2) of the process involves the preparation of the alkaline iron within the waste stream or storage vessel. A third embodiment (Number 3) of the process involves the procurement of the alkaline iron by any other means followed by addition to the waste stream or storage vessel. The sludge referenced herein is a natural, biological wastewater sludge; that is, a sludge that is not produced by flocculation or precipitation by some chemical agent.

Process Embodiment Number 1—An aqueous solution of iron salt, commonly ferric chloride, ferric sulfate, ferrous chloride, or ferrous sulfate, is added with mixing to an aqueous solution or semi-solid slurry of calcium, magnesium, or sodium alkaline salt, commonly bicarbonate, carbonate, hydroxide, or oxide. Standard chemical reaction stoichiometry can be used to estimate the amounts of reactants required to produce the desired amount of alkaline iron product as one skilled in the art can readily understand. The alkaline iron compound will precipitate from solution, making a slurry product that is ready for immediate use in the waste stream or is ready for storage for later use.

Alkaline iron, prepared by this embodiment, is added with mixing at one or more upstream locations (Points "A" in FIG. 1) from malodor problem points (Points "X" in FIG. 1) in a wastewater collection system, and/or is added to malodorous treatment units within a wastewater treatment plant depicted by "L" and "S" in FIG. 1, and/or is added to malodorous sludge transmission or storage vessels depicted by "T" in FIG. 1 prior to beneficial reuse or disposal of the sludge solids.

The amount of alkaline iron product sufficient to remove and control dissolved hydrogen sulfide and other malodorous compounds will depend on the strength of the waste, the type of waste, the solids concentration of the waste, the desired malodor suppression time, and the temperature of the waste. Efficient dosing of the alkaline iron for malodor control should be determined by bench testing or pilot studies as one skilled in the art can readily understand using various doses of the alkaline iron product in representative waste samples at simulated field conditions.

Process Embodiment Number 2—The alkaline iron product can be produced directly in the waste stream or containment vessel by adding, successively with mixing, an aqueous solution or semi-solid slurry of calcium, magnesium, or sodium alkaline salt, commonly bicarbonate, carbonate, hydroxide, or oxide, and an aqueous solution of iron salt, commonly ferric chloride, ferric sulfate, ferrous chloride, or ferrous sulfate, directly to the waste. Standard chemical reaction stoichiometry can be used to estimate the amounts of reactants required to produce the desired amount of alkaline iron product as one skilled in the art can readily understand.

Alkaline iron preparation and use by this embodiment is performed at any upstream location (Points "A" in FIG. 1) from malodor problem points (Points "X" in FIG. 1) in a wastewater collection system where the wastewater is non-anaerobic, and/or is performed in malodorous treatment units within a wastewater treatment plant depicted by "L" and "S" in FIG. 1, and/or is performed in malodorous sludge transmission or storage vessels depicted by "T" in FIG. 1 prior to beneficial reuse or disposal of the sludge solids.

The amount of alkaline iron product sufficient to remove and control dissolved hydrogen sulfide and other malodorous compounds will depend on the strength of the waste, the type of waste, the solids concentration of the waste, the desired malodor suppression time, and the temperature of the waste. The amount of alkaline iron production required for efficient malodor control should be determined by bench testing or pilot studies as one skilled in the art can readily understand using various production doses of the alkaline iron product in representative waste samples at simulated field conditions.

Process Embodiment Number 3—Alkaline iron, as a single compound or mixture of compounds including ferrous and ferric hydroxide, bicarbonate, carbonate, hydroxide oxide, and hydrated oxide, is obtained or prepared by any other means not described in Embodiment Numbers 1 and 2.

Alkaine iron, prepared by this embodiment, is added with mixing at one or more upstream locations (Points "A" in FIG. 1) from malodor problem points (Points "X" in FIG. 1) in a wastewater collection system, and/or is added to malodorous treatment units within a wastewater treatment plant depicted by "L" and "S" in FIG. 1, and/or is added to malodorous sludge transmission or storage vessels depicted by "T" in FIG. 1 prior to beneficial reuse or disposal of the sludge solids.

The amount of alkaline iron product sufficient to remove and control dissolved hydrogen sulfide and other malodorous compounds will depend on the strength of the waste, the type of waste, the solids concentration of the waste, the desired malodor suppression time, and the temperature of the waste. Efficient dosing of the alkaline iron for malodor control should be determined by bench testing or pilot studies as one skilled in the art can readily understand using various doses of the alkaline iron product in representative waste samples at simulated field conditions.

The following examples set forth illustrations of the practice of this invention.

EXAMPLE 1

Bench Scale Testing on 1% Wastewater Sludge: 1000 ml samples of raw, unstabilized municipal primary and secondary wastewater sludge at 1% solids were dosed with 300 and 600 ppm of iron as alkaline iron (AI) prepared by process embodiment numbers 1 and 2. The immediate soluble sulfide concentration of 30 ppm in the raw waste was mitigated to <1 ppm sulfide in both samples. The 300 ppm AI dose suppressed soluble sulfide formation for 48 hours while the 600 ppm AI dose suppressed soluble sulfide for greater than 120 hours. Both AI doses raised immediate sample pH from 5.8 to 6.3.

EXAMPLE 2

Bench Scale Testing on 4% Wastewater Sludge: A 1000 ml sample of raw, unstabilized municipal primary wastewater sludge at 4% solids was dosed with 1200 ppm iron as alkaline iron (AI) prepared by process embodiment number 1. The immediate soluble sulfide concentration of 40 ppm in the raw waste was mitigated to <1 ppm sulfide and subsequent sulfide formation was suppressed for greater than 240 hours. Vaporous total mercaptans were also mitigated and suppressed from 100 ppm in the raw waste to <0.5 ppm for greater than 240 hours.

EXAMPLE 3

Bench Scale Testing on Raw Wastewater: 1000 ml samples of raw municipal wastewater were dosed with 10 and 20 ppm iron as alkaline iron prepared by process embodiment number 1. The immediate soluble sulfide concentration of 2 ppm in both raw wastewater samples was reduced to <1 ppm and subsequent sulfide formations were suppressed for 72 hours in both samples.

EXAMPLE 4

Pilot Scale Testing on a 1% Wastewater Sludge Stream: A continuous flow of 2 million gallons per day of raw, unstabilized primary and secondary wastewater sludge at 1% solids was dosed with 300 ppm and 600 ppm of iron as alkaline iron (AI) prepared by process embodiment number 1. Average immediate soluble sulfide concentrations of 30 ppm in the raw waste were reduced to <1 ppm. Subsequent formation of soluble sulfide was suppressed 48 hours for the 300 ppm AI dose and greater than 120 hours for the 600 ppm AI dose. The 300 ppm AI dose raised sludge pH from 5.8 to 6.8 while the 600 ppm AI dose raised the sludge pH from 5.8 to 7.2. The dewatered sludge solids after processing produced 3000 mg of nuisance offgas per kg of sludge cake before AI treatment and 150 mg of nuisance offgas per kg of sludge cake after treatment with AI, where nuisance offgas is defined as cumulative concentrations of hydrogen sulfide and total mercaptans offgassed from dewatered sludge cake.

Summary, Ramifications, and Scope of Invention

Accordingly, the reader will see that the process described in this invention provides for removal of dissolved hydrogen sulfide and other malodorous compounds without the adverse effects of acid byproducts AND long-term suppression of hydrogen sulfide and other malodorous compound formation AND reduction of acidity and corrosion through alkalinity and pH enhancements for liquid and sludge wastewater systems in a single dose application.

This process can be applied and practiced in any liquid or sludge waste system subject to sulfide malodors, typically public and private sewage collection and treatment works; industrial and commercial waste systems; natural and man-made polluted impoundments or waterways; and stationary and mobile, domestic, industrial and recreational septic systems.

Although the present invention has been described in conjunction with preferred embodiments, it is to be understood that modifications and variations may be substituted without departing from the spirit and scope of the invention as those skilled in the art will readily understand. Such modifications and variations are considered to be within the purview and scope of the invention and the appended claims.

I claim:

1. A process for controlling odors and acidity in wastewater comprising the step of adding to the wastewater an alkaline iron product at a point upstream from a malodor problem point.

2. The process of claim 1 further comprising the step of mixing the alkaline iron product and the wastewater.

3. The process of claim 1 wherein the alkaline iron product is selected from the group consisting of ferrous hydroxide, ferrous carbonate, ferrous bicarbonate, hydrated ferrous oxide, ferric hydroxide, ferric carbonate, ferric bicarbonate, ferric hydroxide oxide, hydrated ferric oxide, and mixtures thereof.

4. The process of claim 1 wherein the alkaline iron product is prepared by mixing approximately stoichiometric quantities of an iron salt with an alkaline salt under non-anaerobic conditions.

5. The process of claim 1 wherein the point upstream from a malodor problem point is in the wastewater collection system.

6. A process for controlling odors and acidity in wastewater comprising the step of preparing an alkaline iron product within the wastewater by adding successively to the wastewater first an alkaline salt followed by an iron salt at approximately the same point in the wastewater with the point in the wastewater being upstream from a malodor problem point and being a point where the wastewater is non-anaerobic and wherein the alkaline salt and the iron salt are added in approximately stoichiometric proportions.

7. The process of claim 6, further comprising the step of mixing the alkaline salt and the iron salt in the wastewater to promote the formation of the alkaline iron product.

8. The process of claim 6 wherein the iron salt is selected from the group consisting of ferric chloride, ferric sulfate, ferrous chloride, ferrous sulfate and mixtures thereof.

9. The process of claim 6 wherein the alkaline salt is selected from the group consisting of calcium bicarbonate, calcium carbonate, calcium hydroxide, calcium oxide, magnesium bicarbonate, magnesium carbonate, magnesium hydroxide, magnesium oxide, sodium bicarbonate, sodium carbonate, sodium hydroxide, sodium oxide, and mixtures thereof.

10. A process for suppressing the formation of dissolved hydrogen sulfide and other malodorous substances in wastewater comprising the step of adding to the wastewater alkaline iron product at a point upstream from a malodor-problem point.

11. The process of claim 10 further comprising the step of mixing the alkaline iron product and the wastewater.

12. The process of claim 10 wherein the alkaline iron product is selected from the group consisting of ferrous hydroxide, ferrous carbonate, ferrous bicarbonate, hydrated ferrous oxide, ferric hydroxide, ferric carbonate, ferric bicarbonate, ferric hydroxide oxide, hydrated ferric oxide, and mixtures thereof.

13. The process of claim 10 wherein the alkaline iron product is prepared by mixing approximately stoichiometric quantities of an iron salt with an alkaline salt under non-anaerobic conditions.

14. A process for suppressing the formation of dissolved hydrogen sulfide and other malodorous substances in wastewater comprising the step of preparing an alkaline iron product within the wastewater by adding successively to the wastewater first an alkaline salt followed by an iron salt at approximately the same point in the wastewater with the point in the wastewater being upstream from a malodor problem point and being a point where the wastewater is non-anaerobic and wherein the alkaline salt and the iron salt are added in approximately stoichiometric proportions.

15. The process of claim 14, further comprising the step of mixing the alkaline salt and the iron salt in the wastewater to promote the formation of the alkaline iron product.

16. The process of claim 14 wherein the iron salt is selected from the group consisting of ferric chloride, ferric sulfate, ferrous chloride, ferrous sulfate and mixtures thereof.

17. The process of claim 14 wherein the alkaline salt is selected from the group consisting of calcium bicarbonate, calcium carbonate, calcium hydroxide, calcium oxide, magnesium bicarbonate, magnesium carbonate, magnesium hydroxide, magnesium oxide, sodium bicarbonate, sodium carbonate, sodium hydroxide, sodium oxide and mixtures thereof.

18. A process for controlling and suppressing odors and acidity in natural, biological sludge formed from wastewater treatment comprising the step of adding to the sludge an alkaline iron product selected from the group consisting of ferrous hydroxide, ferrous carbonate, ferrous bicarbonate, hydrated ferrous oxide, ferric hydroxide, ferric carbonate, ferric bicarbonate, ferric hydroxide oxide, hydrated ferric oxide, and mixtures thereof.

19. The process of claim 18 further comprising the step of mixing the alkaline iron product and the sludge.

20. A process for controlling and suppressing odors and acidity in natural, biological wastewater sludge formed from wastewater treatment comprising the step of preparing an alkaline iron product within the sludge by adding successively to the sludge first an alkaline salt followed by an iron salt at approximately the same point in the sludge, wherein the alkaline salt and the iron salt are added in approximately stoichiometric proportions, and further wherein the iron salt is selected from the group consisting of ferric chloride, ferric sulfate, ferrous chloride, ferrous sulfate and mixtures thereof, and the alkaline salt is selected from the group consisting of calcium bicarbonate, calcium carbonate, calcium hydroxide, calcium oxide, magnesium bicarbonate, magnesium carbonate, magnesium hydroxide, magnesium oxide, sodium bicarbonate, sodium carbonate, sodium hydroxide, sodium oxide, and mixtures thereof.

21. The process of claim 20, further comprising the step of mixing the alkaline salt and the iron salt in the sludge to promote the formation of the alkaline iron product.

22. The process of claim 20 wherein the point in the sludge where the alkaline salt and the iron salt are added is a point where the sludge is non-anaerobic.

* * * * *